United States Patent
Armstrong et al.

(10) Patent No.: US 6,182,248 B1
(45) Date of Patent: Jan. 30, 2001

(54) METHOD AND TOOL FOR COMPUTER BUS FAULT ISOLATION AND RECOVERY DESIGN VERIFICATION

(75) Inventors: Cynthia Joan Armstrong, Austin; Scott Leonard Daniels, Cedar Park; Alongkorn Kitamorn, Austin; Brian Anthony Oehlke, Leander; Richard Martin Tonry, Austin, all of TX (US)

(73) Assignee: International Business Machines Corporation, Armonk, NY (US)

( * ) Notice: Under 35 U.S.C. 154(b), the term of this patent shall be extended for 0 days.

(21) Appl. No.: 09/056,591

(22) Filed: Apr. 7, 1998

(51) Int. Cl.[7] .................................................. H02H 3/05
(52) U.S. Cl. ............................................. 714/43; 714/757
(58) Field of Search .................................. 714/43, 25, 27, 714/32, 41, 42, 47, 736, 742, 745; 324/757, 758, 765

(56) References Cited

U.S. PATENT DOCUMENTS

| | | | |
|---|---|---|---|
| 4,156,132 | * | 5/1979 | Hazzard .............................. 235/302 |
| 4,759,019 | * | 7/1988 | Bentley et al. ........................ 371/3 |
| 4,779,271 | * | 10/1988 | Suzuki ................................. 371/3 |
| 4,996,688 | * | 2/1991 | Byers et al. ....................... 371/16.5 |
| 4,999,837 | * | 3/1991 | Reynolds et al. ....................... 371/3 |
| 5,001,712 | * | 3/1991 | Splett et al. .......................... 371/3 |
| 5,008,885 | * | 4/1991 | Huang et al. .......................... 371/3 |
| 5,229,999 | * | 7/1993 | Cushing et al. ........................ 371/3 |
| 5,428,624 | * | 6/1995 | Blair et al. ......................... 371/22.3 |
| 5,561,762 | * | 10/1996 | Smith et al. ..................... 395/183.09 |
| 5,668,816 | * | 9/1997 | Douskey et al. ..................... 371/21.3 |
| 5,671,352 | * | 9/1997 | Subrahmaniam et al. ....... 395/183.17 |

* cited by examiner

Primary Examiner—Nadeem Iqbal
(74) Attorney, Agent, or Firm—Volel Emile; Felsman, Bradley, Vaden, Gunter & Dillon, LLP (57) ABSTRACT

An error injection tool, connected to a bus to be tested in such a manner as not to interfere with normal operation, is employed for error detection and recovery design verification. The error injection tool is connected to the bus to be tested within a data processing system, the system is powered on, and applications simulating normal system loading are run. A desired error is then selected, and the error injection tool is actuated. The error injection tool monitors bus cycles and transactions through selected signals and, upon detecting an appropriate cycle or transaction, overdrives a selected conductor within the bus being tested to inject an error. The selected bus conductor is overdriven (forced) to a logic high or a logic low for a single clock cycle, simulating the intermittent nature of errors likely to occur during normal operation. Bus error signals are then monitored to ascertain whether the error was successfully injected. If not, subsequent attempts during appropriate bus cycles or transaction may continue until error injection is successful. Once an error is successfully injected, the operation of fault isolation and recovery facilities for the bus being tested may be observed to ascertain whether they are properly functioning. The error injection tool is inexpensive, readily built from off-the-shelf components, easily adaptable to a variety of bus architectures, and very simple to employ.

26 Claims, 5 Drawing Sheets

METHOD AND TOOL FOR COMPUTER BUS FAULT ISOLATION AND RECOVERY DESIGN VERIFICATION

BACKGROUND OF THE INVENTION

1. Technical Field

The present invention relates in general to testing of bus fault isolation and recovery mechanisms and in particular to design verification of bus fault isolation and recovery mechanisms. Still more particularly, the present invention relates to error injection for design verification of bus fault isolation and recovery mechanisms.

2. Description of the Related Art

All data processing systems include busses, employed to transfer data to and from processors, memory controllers, memory, and input/output (I/O) devices. For various reasons, these busses are susceptible to errors such as electrical noises, imperfect connection, and the like. Various bus architectures provide for error detection and recovery in the event of such errors. As a result, error checking and recovery handling is typically built into the design of data processing system busses, generally in the form of address and data bus parity checking and error correction code (ECC) checking.

Error checking and handling recovery system designs must themselves be verified to ensure proper operation. Therefore, to ensure that error detection, capture, reporting, and correction facilities within fault isolation or recovery designs work as intended, design verification methodologies and tools are required which simulate errors likely to occur on a data processing system bus. The simulated errors should mimic the actual hardware errors which occur while the system is running typical software applications, and should work properly on all bus transactions supported by the bus architecture for which the error checking and recovery system being tested is designed.

Existing bus design verification tools are generally designed for the verification of bus functions for a given architecture, not particularly for verifying error detection and recovery mechanisms for a given design. Therefore such verification tools are prohibitively expensive and complex. Moreover, such verification tools are typically designed for one specific bus architecture, so that the fault isolation and recovery verification methodologies and tools are not applicable to other bus architectures. Finally, available tools are not capable of causing a single cycle, precise error.

It would be desirable, therefore, to provide a design verification mechanism for error detection and recovery facilities which is inexpensive, easy to assemble using off-the-shelf components, and very simple to use. It would further be advantageous for the methodology and tool utilized for design verification to be readily applicable to multiple bus architectures.

SUMMARY OF THE INVENTION

It is therefore one object of the present invention to provide improved method and apparatus for testing bus fault isolation and recovery mechanisms for data processing systems.

It is another object of the present invention to provide a method and apparatus for design verification of bus fault isolation and recovery mechanisms in data processing systems.

It is yet another object of the present invention to provide a method and apparatus for error injection for design verification of bus fault isolation and recovery mechanisms in data processing systems.

The foregoing objects are achieved as is now described. An error injection tool, connected to a bus to be tested in such a manner as not to interfere with normal operation, is employed for error detection and recovery design verification. The error injection tool is connected to the bus to be tested within a data processing system, the system is powered on, and applications simulating normal system loading are run. A desired error is then selected, and the error injection tool is actuated. The error injection tool monitors bus cycles and transactions through selected signals and, upon detecting an appropriate cycle or transaction, overdrives a selected conductor within the bus being tested to inject an error. The selected bus conductor is overdriven (forced) to a logic high or a logic low for a single clock cycle, simulating the intermittent nature of errors likely to occur during normal operation. Bus error signals are then monitored to ascertain whether the error was successfully injected. If not, subsequent attempts during appropriate bus cycles or transaction may continue until error injection is successful. Once an error is successfully injected, the operation of fault isolation and recovery facilities for the bus being tested may be observed to ascertain whether they are properly functioning. The error injection tool is inexpensive, readily built from off-the-shelf components, easily adaptable to a variety of bus architectures, and very simple to employ. A variety of different errors, such as address/data parity errors when different bus masters are driving the bus, may be selected for comprehensive verification of the error detection and recovery design.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
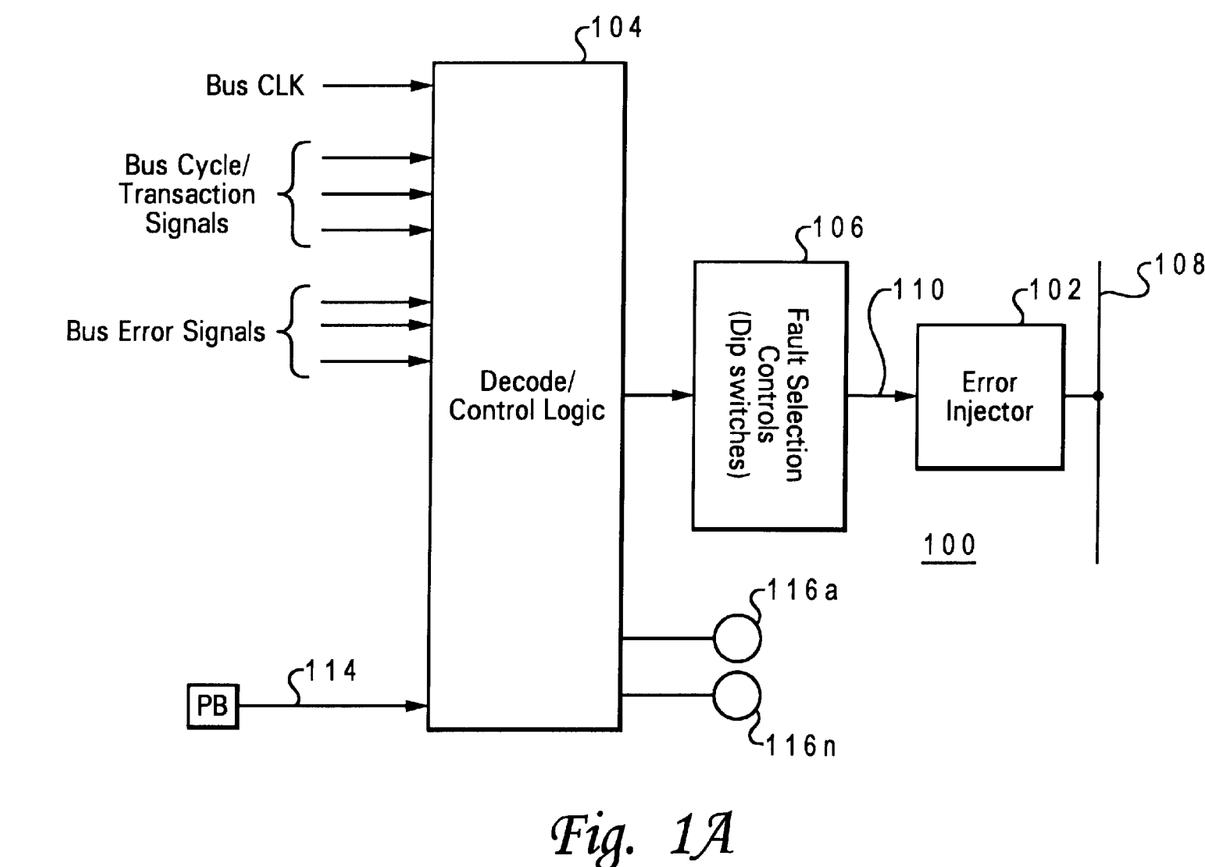
FIGS. 1A–1C depict circuit diagrams for an error injection tool for design verification of error detection and recovery mechanisms, including tools for such design verification for a processor local bus, a system bus, a memory bus, and a PCI bus, in accordance with a preferred embodiment of the present invention.
Figure 1B:
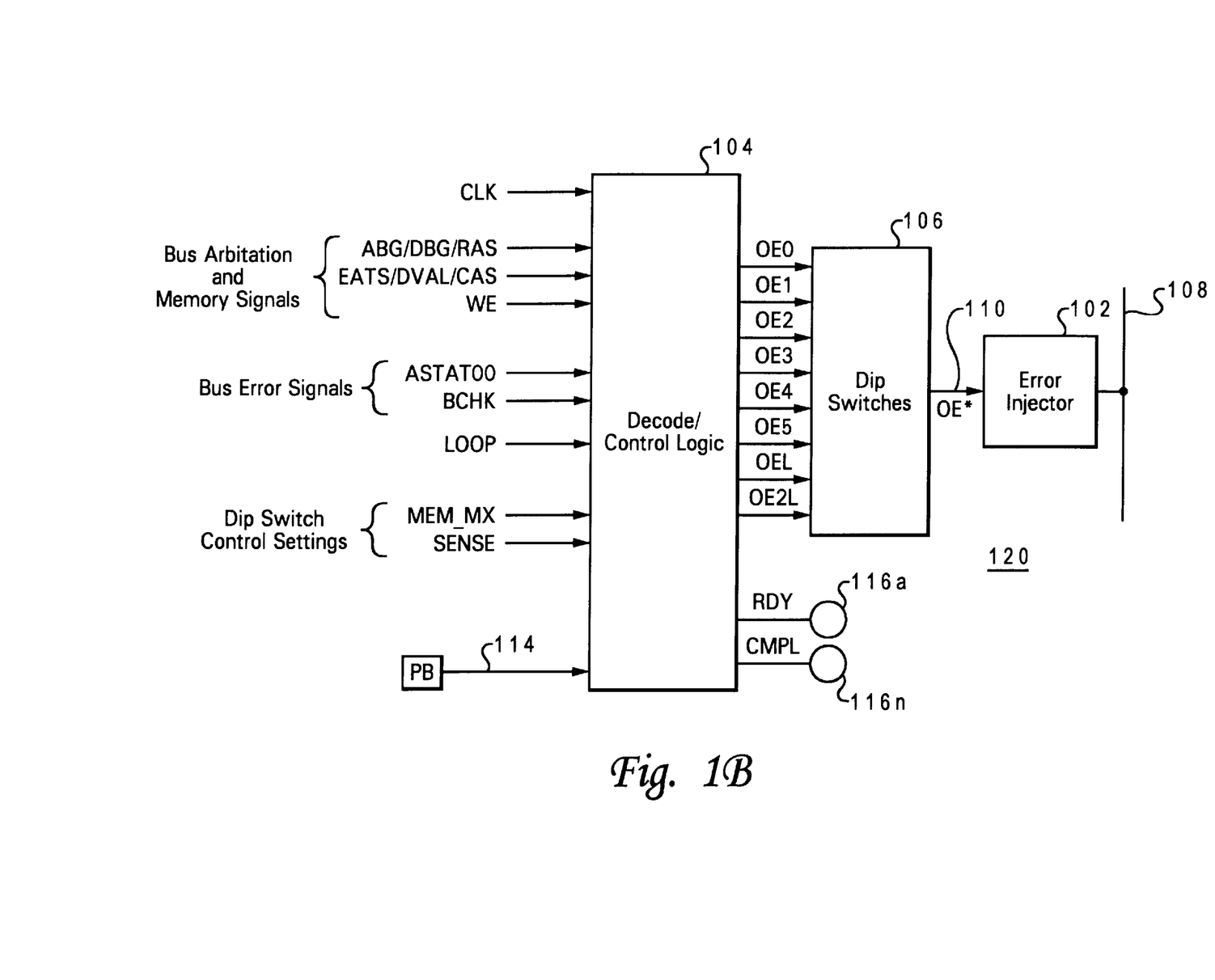
Figure 1C:
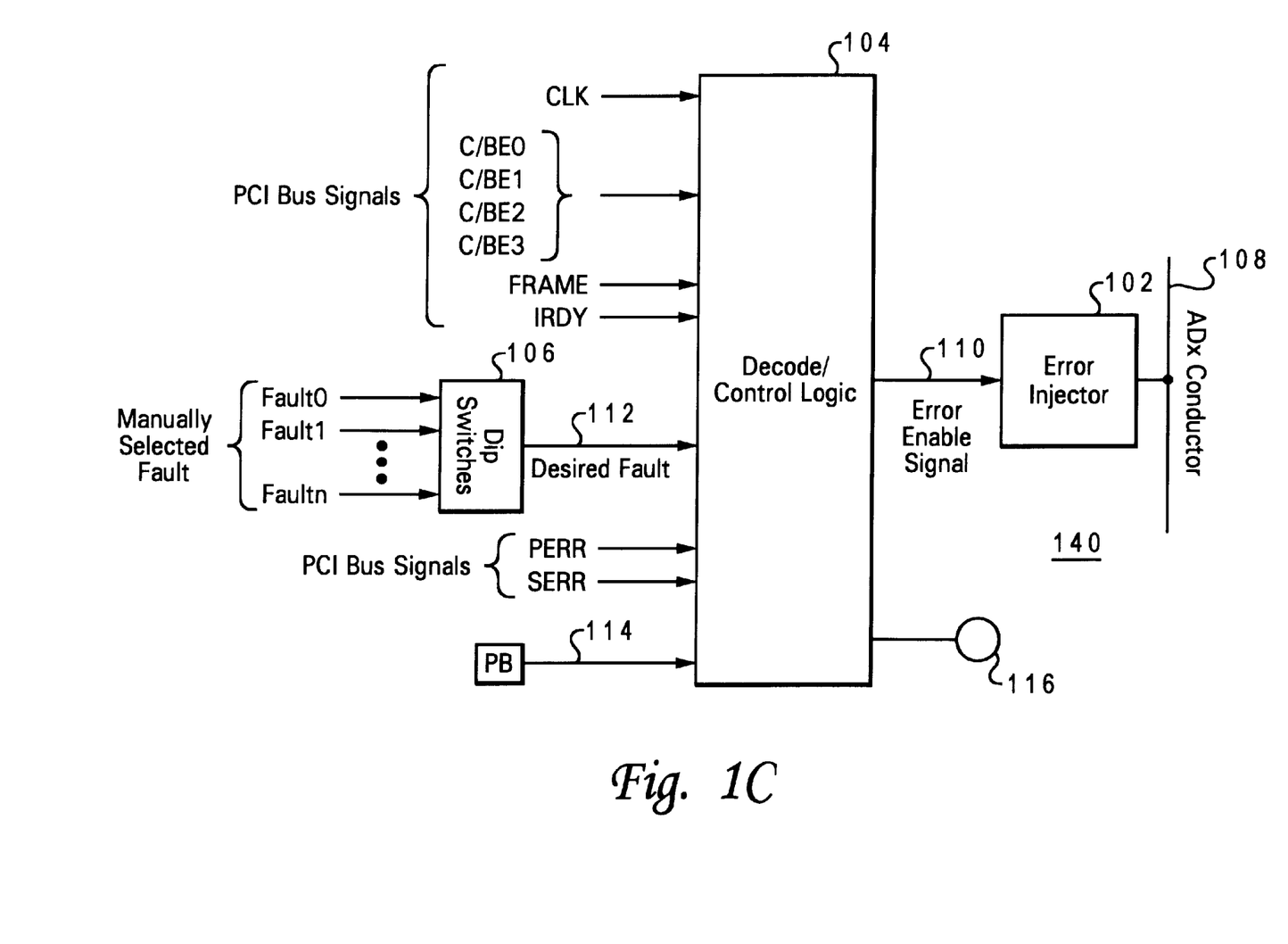

With reference now to the figures, and in particular with reference to FIGS. 1A through 1C, circuit diagrams for an error injection tool for design verification of error detection and recovery mechanisms in accordance with a preferred embodiment of the present invention is depicted. The core problem in design verification of an error detection and recovery system is devising an error injection tool which injects momentary errors on one of the multiple busses in a data processing system. The error injection tool should produce errors which will simulate a random, dynamic error for only one bus cycle to simulate the random errors which typically occur while the data processing system is booting and/or running software applications.

The overall verification methodology of the present invention consists of:

1. With the system power off, attach the error injection tool, which can introduced one or more selected errors onto the bus, to the bus being tested.
2. Power on and boot the system, then start software applications which mimic the typical system usage of the bus being tested.
3. Inject a selected error onto the bus being tested.
4. Observe the error handling or recovery behavior and verify operation in accordance with the design. Thus, the error detection and recovery design verification methodology of the present invention requires implementation of an error injection tool, which itself comprises several elements for each specific bus architecture to be tested:
1. Determine how to utilize bus specific signals to trigger the control logic of the error injection tool;
2. Determine how to connect the error injection tool to the bus to be tested without effecting the bus's ability to operate and without altering the operation of the bus;
3. Determine how to supply sufficient current to alter the signal on a bus conductor by forcing the signal level to the opposite level; and
4. Develop a controller for the error injection tool which may monitor the bus activity to trigger the "error signal" at the appropriate time and for the appropriate duration, and activate the "error signal." Based on this approach, an error injection tool may be implemented for the bus architecture of the design to be tested. The basic error injection tool design, depicted in FIG. 1A, is simple and readily adaptable to various bus architectures.

In general, error injection tool 100 includes error injector 102, decode and/or control logic 104, and fault or error selection controls 106. Decode/control logic 104 will typically receive the bus CLK signal, various bus cycle or transaction signals, and any bus error signals for the bus being tested. An actuation signal 114 from, for example, a push-button control on error injection tool 100 selectively actuates error injection tool 100 for injection of error signals on the bus being tested. After being actuated, decode logic 104 waits for the appropriate bus cycle or transaction and enables the error injection.

Fault selection controls 106, which may be a bank of dip switches, may be an input to decode/control logic 104 or a filter for the enable signal 110 output of decode/control logic 104 to error injector 102 as shown. Error injector 102, upon being enabled, injects an error on one or more bus conductors 108, typically by overdriving the selected bus conductors to a logical state opposite the correct state for a given bus cycle or transaction. Error injection tool 100 may also include one or more indicators 116a–116n for indicating readiness of error injection tool 100 to inject an error, current injection of an error, successful injection of an error, or any other useful information regarding operation of error injection tool 100.

FIG. 1B depicts an error injection tool for the 6XX processor local bus, 6MX system bus, and memory bus architectures within many data processing systems employing the PowerPC™ family of processors, such as the RS/6000 symmetric multiprocessing (SMP) systems available from International Business Machines Corporation of Armonk, N.Y. Error injection tool 120 for this embodiment again includes error injector 102, decode/control logic 104, and dip switches 106. Error injector 102 is connected to the selected bus conductor 108 on which the error is to be injected. Error injector 102 receives an output enable signal (OE*) 110 from dip switches 106, which are set to define the bus type being tested and the type of error desired.

In addition to bus clock signal CLK and activation signal 114 from the push-button initiation control, control logic 104 receives bus arbitration and memory signals including address bus grant ABG, data bus grant DBG, or row address strobe RAS at one input, early address transfer start EATS, data valid DVAL, or column address strobe CAS at a second input, and write enable WE at a third input, as well as bus error signals ASTAT00 and BCHK. The first, second and third inputs are connected to appropriate bus conductors depending on the bus architecture being tested and receive one of the input signals designated.

Control logic 104 also receives a loop enable signal LOOP from a loop function switch which allows a user to selectively control whether error injection tool 120 attempts a single error injection onto selected bus conductor 108 or continues error injection attempts on successive bus cycles or transactions until an error is successfully injected. Control logic 104 also receives a memory-testing signal MEM_MX switched to select the bus architecture being tested (6MX system bus/memory bus or 6XX processor local bus) and an error sensing signal SENSE switched to select active-high or active-low error signal detection.

Control logic 104 outputs error enable signals OE1, OE2, OE3, OE4, OE5, OEL, and OE2L, filtered by dip switches 106 to become error enable signal OE* 110 to error injector 102, which are asserted depending on the particular error which is desired and the bus onto which the error is to be injected. Assertion of error enable signals OE1, OE2, OE3, OE4, OE5, OEL, and OE2L depends upon a current state within control logic 104, described in further detail below. Optional LED indicators 116a and 116b are connected to control logic 104 to indicate a ready state and successful injection of an error.

In a specific implementation of error injection tool 120, control logic 104 is a Xilinx XC7336-5 EPLD chip, selected for its speed and programmability, configured to implement a 7-state state machine as described below. Error injector 102 comprises a TI ALVCH16835 bus driver chip configured to supply sufficient current to bus conductor 108 in a very short time. The ALVCH16835 chip is configured to remain in a tri-state mode until the error signal is received, when it drives the bus with either a logic 1 or 0 depending on the predefined, jumper selected inputs to the chip. To insure sufficient current for forcing the bus signal to the opposite level, all of the bus driver chip outputs are connected together so that all of the individual drivers within the chip are used to force the bus to the opposite level. Accordingly, all inputs to the bus driver chip are tied together and connected to the same voltage level, either ground or VCC. The output enable (OE) signal of the bus driver chip is tied to the error enable signal 110 from control logic 104 and dip switches 106. The ALVCH16835 bus driver chip load enable (LE) input is tied high, and the bus driver chip clock signal (CLK) is tied low to insure a transparent mode of operation for the bus driver chip.

Error injection tool 120 may be employed to inject errors on the 6XX processor local bus within a data processing system including: address parity error when processor 0/1/2/3 is the bus master; address parity error when the memory controller is the bus master; data parity error when processor 0/1/2/3 is the bus master; data parity error when the memory controller is the bus master; data control bus parity error when processor 0/1/2/3 is the master; and data control bus parity error when the memory controller is the master.

The 6XX processor local bus is tapped for error injection tool 102 at one of the processor card slots (such as the second processor card slot) using a logic analyzer probe card. The processor card slot contains all of the required signals except for the bus arbitration signals, which are taken from a BERG connector elsewhere on the backplane. The clock is the 83 MHz processor clock taken from the processor slot, and the probe card with error injection tool 120 is utilized for both 6XX data and address bus errors.

An address parity error is injected on the 6XX address bus by error injection tool 120 when a particular bus master is utilizing the bus, determined by connecting error injection tool 120 address bus grant input ABG to the ABG signal of either any of the processors or the memory controller. To trigger the address parity error at the correct time, error injection tool 120 monitors the ABG signal and, when it goes low, waits for the early address transfer start input EATS signal to go low, then injects the address bus parity error one cycle after the input EATS signal is activated.

The address bit for the selected bus conductor is forced high or low by error injection tool 120, depending upon the position of a jumper on error injection tool 120, for one cycle. Control logic 104 then monitors the input ASTAT signals from the 6XX bus for the binary value 00 to determine if the error was accepted. If so, control logic 104 returns to the ready state and indicates that the error was accepted. If the error did not occur, control logic 104 returns to the ready state without indicating an error. This may occur if the value of the address bit being corrupted was the same as the injected signal (i.e., the address bit is a logic 1 and the injected value is also a logic 1. If the LOOP input is enabled, control logic 104 will continue to attempt error injection until successful or interrupted.

A data parity error is injected, in much the same manner as an address parity error, when a particular master is granted the data bus. This is determined by connecting the data bus grant input DBG to the DBG signal of either any of the processors or the memory controller. To trigger the error at the correct time, control logic 104 monitors the DBG signal. When the DBG signal goes low, control logic 104 waits for the data valid input signal DVAL to go low, then injects the error one cycle after the DVAL signal is activated. DVAL is active for multiple beat data transfer bursts, with the error injected during the second beat of the data transfer of the 6XX data bus.

The data bit for selected data bus conductor 108 is forced high or low, depending upon the position of a jumper on error injection tool 120, for one cycle. Control logic 104 then monitors the 6XX bus bus-check signal BCHK to determine whether the error was accepted. (ASTAT00 is two signals. When detecting a bus check, one signal is tied low and the other is connect to the BCHK input. When detecting a machine check, one signal is tied high and the other is connected to MACH_CHK with the SENSE switch set to 0). If so, control logic 104 returns to the ready state and indicates that the error was accepted; if not, control logic 104 returns to the ready state without indicating an error. As described above, this could occur if the value of the data bit being corrupted was the same as the injected signal (i.e., the data bit is a logic 1 and the injected value is also a logic 1). If the LOOP input is enabled, control logic 104 will continue to attempt error injection until successful or interrupted.

Error injection tool 120 may be employed to inject errors on the 6MX system bus within a data processing system including: address parity error when (6MX system bus to PCI) bridge device 0/1/2 is the bus master; address parity error when the memory controller is the bus master; data parity error when bridge device 0/1/2 is the bus master; and data parity error when the memory controller is the bus master.

Error injection on the 6MX bus is similar to error injection on the 6XX bus, with the main differences being where the bus is tapped and where the arbitration signals are found. The 6MX bus may be tapped for error injection tool 120 at an I/O connector using the MX bus logic analyzer monitor board which connects between an I/O card and an I/O connector of the backplane. All required signals, except the arbitration signals (ABG, DBG) can be found on the monitor board, with the arbitration signals found on a BERG connector located on the I/O planar. Error injection tool 120 gets its clock input CLK from the MX monitor board, which uses the 50 MHz clock going to the memory controller modules. Other than these differences, however, address and data parity error injection occurs as described above for the 6XX bus.

Error injection tool .120 may be employed to inject single and double bit memory errors on the memory bus within a data processing system. Single and double bit memory errors are injected by error injection tool 120 using a dual in-line memory module (DIMM) interposer board installed between the memory card and the DIMM. Error injection tool 120 gets the necessary signals and the 83 MHz memory clock from this interposer board.

A single bit memory error is created by disconnecting on of the 72 data bit signals from the DIMM via a jumper on the interposer and pulling the signal either high or low. The single bit memory error is a hard failure—that is, an error is detected for all memory bus cycles. The error should be transparent since the error correction code (ECC) logic of the memory controller corrects the "stuck" bit. Thus, the data processing system should continue to operate as though no failure has taken place.

A double bit memory error is created by first instituting a single bit memory error as described above. The second error bit is created dynamically utilizing error injection tool 120, which injects the second error bit during a memory read cycle (since an error injected during a memory write cycle would not be detected until that address is read). Control logic 104 received the row address strobe (RAS), column address strobe (CAS), and write enable (WE) signals at inputs RAS, CAS, and WE. Control logic receives the clock signal from the CLK1 pin of the interposer card.

When activation signal 114 is asserted, control logic 104 waits for a signal on input RAS. If inputs RAS and CAS are both active, a memory refresh cycle is occurring and control logic 104 restarts to wait for the next signal on input RAS. If input RAS is active but input CAS is not, control logic 104 then monitors input CAS for a signal, which should occur a few cycles later. If inputs CAS and WE are active at the same time, then the operation is a memory write and control logic 104 resets to the initial state and waits for the next signal on input RAS, restarting the whole process over. If input CAS alone is active, then the operation is a memory read. The error is then injected during the next two cycles. The error will not always occur due to the nature of the data pattern. Both the constant single bit error and the injected error of the second bit must be the opposite value of the data on the conductors selected for corruption. Thus, it may take several attempts to actually cause a double bit error, with error injection tool 120 returning to the ready state without indicating an error each time. With the LOOP function enabled (1), the error is retried repeatedly until the error occurs. The error is indicated by LED indicator 116b being turned on.

FIG. 1C depicts an error injection tool for a peripheral component interconnect (PCI) bus architecture. This widely-used architecture supports many complex features including I/O expansion through PCI-to-PCI bridges, peer-to-peer (device-to-device) data transfers between masters and targets, multi-function devices, and both integrated circuit and plug-in adapter card devices. Error injection tool 140 once again includes error injector 102, decode/control logic 104, a bank of dip switches 106, and an indicator 116, such as an LED, connected to control logic 104 for indicating successful injection of an error.

Error injector 102 is a powerful buffer (driver) circuit which is connected to an address/data bus conductor (ADx) 108 of choice on the PCI bus being tested. When enabled by error enable signal 110, error injector 102 overdrives the selected address/data line ADx 108 to either a high or low state and holds it at that state, thus causing an error on the PCI bus. Error enable signal 110 is provided to error injector 102 by decode/control logic 104 in response to a desired fault, PCI bus signals, and an activation signal 114.

Decode/control logic 104 provides the control logic for enabling error injector 102 at an appropriate time. Decode/control logic 104 receives a desired fault signal 112 corresponding to a selected fault (Fault0, Fault1, ..., Faultn) through a user interface comprising a bank of dip switches 106, employed to select a specific type of fault desired. An activation signal 114, actuated in the exemplary embodiment by a debounced push-button switch which is also a part of the user interface, is employed to initiate the selected fault and is latched within control logic 104.

Control logic 104 receives a plurality of PCI bus signals, including: the PCI bus clock CLK; the cycle frame signal FRAME driven by the current bus master, asserted to indicate that a bus transaction is beginning and deasserted when the transaction is in the final data phase or has completed; the initiator ready signal IRDY indicating the initiating agent's (bus master's) ability to complete the current data phase of the transaction; and the bus command and byte enable signals C/BE0–C/BE3 transferring the bus command during the address phase and indicating which bytes contain meaningful data during the data phase. These four lines are decoded to determine what type of operation is in progress and inject an error if the detected operation matches the desired operation.

Control logic 104 also receives the parity error signal PERR and the system error signal SERR from the PCI bus, respectively indicating data parity errors during all PCI bus transactions except special cycles and address parity errors, data parity errors on a special cycle command, or any other system error where the result will be catastrophic.

Control logic 104 decodes desired fault signal 112, monitors the PCI bus for the appropriate transaction in which to inject the desired fault, provides the enable signal to control error injector 102 which ultimately injects the fault on the PCI bus, and monitors PCI error reporting signals. When assertion of activation signal 114 from the push-button switch is detected (and latched), control logic 104 waits until a PCI bus transaction corresponding to the transaction into which desired fault 112 is to be injected is recognized on the PCI bus. Control logic 104 then asserts error enable signal 110 to error injector 102.

Error injection may not be successful on the first attempt since the state into which selected address/data line ADx 108 is forced may coincide with the correct state of that bit. If control logic 104 does not sense a PCI agent reporting an error, it will continue trying to inject desired fault 112 on successive PCI bus transactions corresponding to the selected fault until PCI signal PERR or SERR is sensed asserted. Upon sensing a PCI agent reporting an error on the PCI bus, control logic 104 resets latched activation signal 114 and will not attempt injecting desired fault 112 again until activation signal 114 is again asserted.

After a PCI device reports an error through assertion of PERR or SERR, the induced fault is removed from selected PCI bus conductor ADx 108 to simulate an actual intermittent hardware error on the PCI bus. This intermittent nature is typical of signal noise, which will normally have a duration affecting only one cycle. The removal of desired fault 112 from bus conductor 108 allows the error handling software routine to properly collect error status from the PCI status register (not shown) or the PCI device driver to recover from the error.

When control logic 104 makes multiple attempts to inject an error into PCI bus transactions of a selected type, it does so without interfering with the integrity of the overall bus transaction. For example, an address parity error is attempted only during the address phase of a transaction. If the attempt is unsuccessful, control logic 104 does not interfere with subsequent data phase(s) of the transaction. Moreover, after an unsuccessful error injection attempt, no interference follows with subsequent transactions not corresponding to a selected transaction into which desired fault 112 is to be injected.

In a specific, exemplary implementation of error injection tool 140 for verifying a system PCI bus fault isolation design, control logic 104 may be implemented with a PALCE26V12H-7JC, a 7 nsec part. Two state machines are utilized within control logic 104 to control fault isolation: a Moore state machine for data parity and a Mealey state machine for address parity. The state machines are clocked by the PCI 33 MHz clock signal CLK. The PAL employed for control logic 104 decodes the selected fault and qualifies it with the current PCI bus transaction.

In this specific implementation, the selected fault is injected on the PCI bus by overdriving a pre-wired address/data signal conductor ADx 108 to zero using a 74S240 driver for error injector 102. The 74S240's enable pin is controlled through error enable signal 110 by the PAL utilized for control logic 104. When control logic 104 asserts its output to enable injection of desired fault 112, the 74S240 overdrives selected address/data signal conductor ADx 108 with a logic low (0V). Otherwise, the 74S240 output is tristated in response to non-assertion of error enable signal 11 from control logic 104. In this specific implementation, an attempt to inject a fault on the PCI bus may or may not be successful on any one bus phase depending, for example, on whether selected address/data signal conductor ADx 108 is supposed to be at a logic low during that phase.

In the specific implementation employed for an example, the user push-button switch asserting activation signal 114 is debounced with a 74LS14-based circuit, with the debounced activation signal 114 latched by control logic 104 to enable injection of the selected fault. Press-and-release of the push-button switch causes control logic 104 to start trying to inject desired fault 112 currently selected by dip switches 106. The user interface dip switches 106 permit selection of eight different faults: data parity on an I/O read; data parity on an I/O write; data parity on a memory read; data parity on a memory write; address parity on an I/O read; address parity on an I/O write; address parity on a memory read; and address parity on a memory write.

Error injection tool 100 in the exemplary implementation is constructed on a standard PCI expansion board which may be easily plugged into a PCI bus having expansion slots, such as the system PCI bus for which fault isolation design verification is desired. All design external signal inputs and outputs are accessed through the standard PCI expansion board connector. To ensure that the fault injection PCI board does not interfere with the system configuration software and normal system operation, both present signals PRSNT1 and PRSNT2 are open, indicating that no expansion board is present within the slot.

The design of error injection tool 100 may easily be extended to include other errors, in addition to those described above, which can occur during other PCI bus transactions. To further extend the flexibility of error injection tool 100, enhancements may be added which allow the user to select (via one or more dip-switches, for example) which address/data signal conductor ADx to inject an error upon and whether error injector 102 overdrives a logic low or a logic high value on the selected address/data signal conductor ADx. The latter feature would be useful for testing isolation and recovery for address-related faults during memory transactions. Extensions might also include permitting user selection of an address range during which error(s) should be injected, a capability allowing error injection tool 100 to inject errors during a pre-defined system transaction such as a direct memory access (DMA) or peripheral input/output (PIO) transaction, or a transaction involving a selected PCI device.

Additional control logic could extend the capability of error injection tool 100 to inject faults during other PCI bus transactions, such as "stuck at 0" and "stuck at 1" faults on the device select (DEVSEL), FRAME, IRDY, and target ready (TRDY) PCI bus control lines. This would permit verification in a controlled manner of system logic and software response to these error conditions, which are designated for system-dependent response by the PCI architecture specification.

Figure 2:
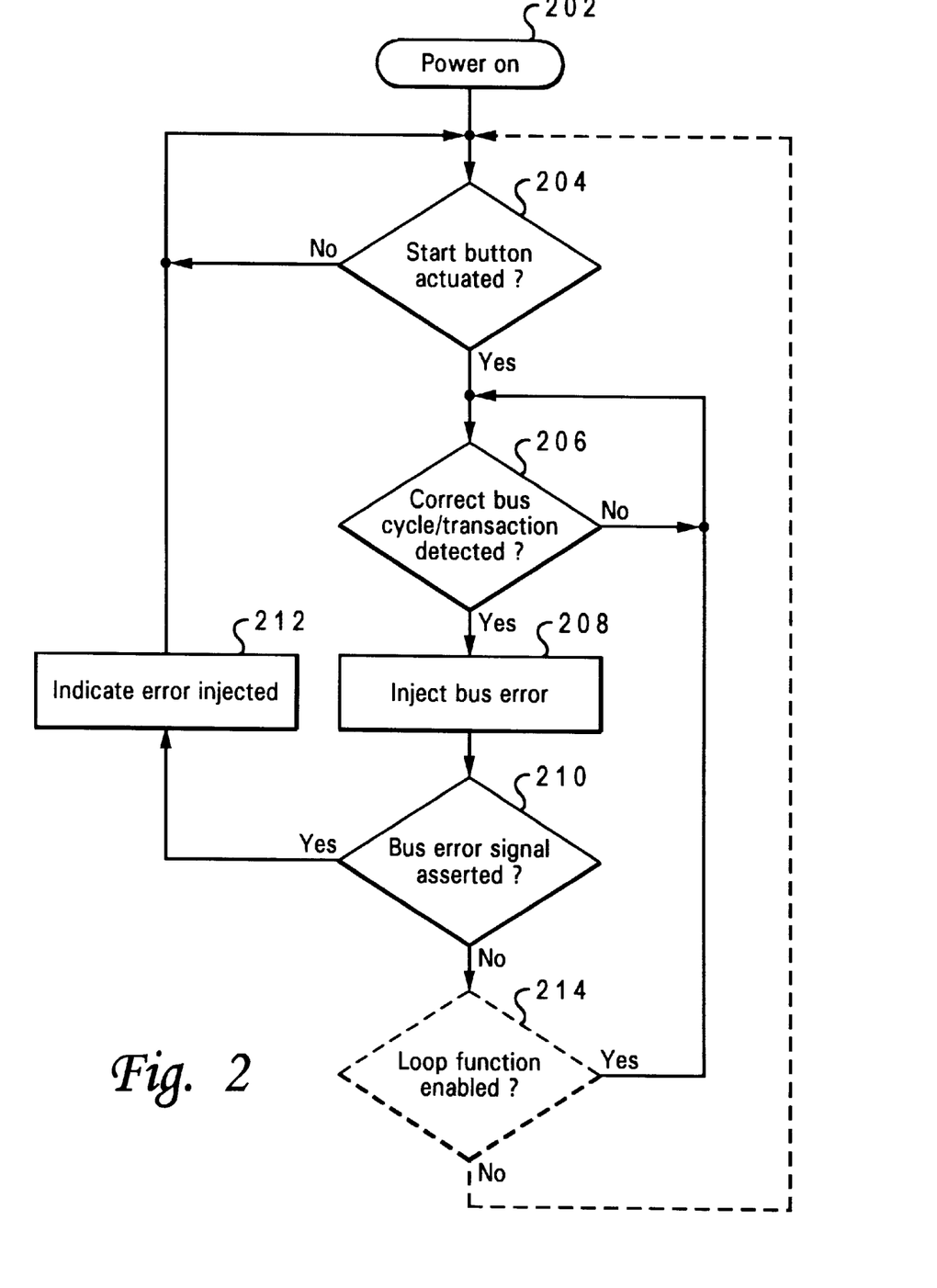
FIG. 2 is a high level flowchart for an error injection process utilizing an error injection tool in accordance with a preferred embodiment of the present invention.

Referring to FIG. 2, a high level flowchart for an error injection process utilizing an error injection tool in accordance with a preferred embodiment of the present invention is illustrated. The process may be implemented within a data processing system including a bus having fault isolation and recovery facilities, the design of which is to be tested utilizing an error injection tool of the type depicted in FIGS. 1A, 1B, and 1C. The error injection tool is connected to the bus to be tested within the data processing system.

The process begins at step 202, which depicts power-on of the system in which verification of an error detection and recovery facility design is undertaken. The process then passes to step 204, which illustrates actuation of the push-button initiating error injection on the bus being tested. If not, the process returns to step 204 and repeats the determination of whether the push-button has been actuated until the push-button is actuated.

Once the push-button is actuated, the process proceeds to step 206, which depicts a determination of whether the corresponding bus cycle or transaction into which the desired error is to be injected is detected on the bus being tested. If not, the process returns to step 206 and repeats the determination of the bus cycle or transaction on the bus being tested until the appropriate cycle or transaction (the type to be corrupted) is detected on the bus being tested.

Once the bus cycle or transaction corresponding to the cycle or transaction into which the desired fault is to be injected is detected on the bus, the process proceeds to step 208, which illustrates injecting the bus error by enabling the error injection tool to overdrive the selected bus conductor. The process then passes to step 210, which depicts a determination of whether a bus error signal is detected on the bus being tested, such as assertion of a PCI PERR or SERR signal or assertion of ASTAT00 on a 6XX processor local bus or 6MX system bus.

If a bus error signal is detected on the bus being tested, the process proceeds to step 212, which illustrates indicating that the error was successfully injected on the bus being tested by, for example, turning on an LED indicator. The process then returns to step 204 to await the next actuation of the push-button switch initiating error injection. If no bus error signal is detected, however, the process proceeds instead to optional step 214, which depicts a determination of whether the loop function is enabled. Either error injection tool depicted in FIG. 1A or 1B may incorporate a user control for selecting whether a single attempt to inject the desired error should be undertaken or whether repeated attempts to inject the desired error should be continue until the error is successfully injected. However, the implementation depicted for PCI busses in FIG. 1C does not include such a feature. Accordingly, in that embodiment, the process proceeds directly from step 210 to step 206 when no bus error signal is asserted and repeats error injection attempts.

If the loop function is enabled, the process proceeds from optional step 214 back to step 206; if not, the process proceeds from optional step 214 back to step 204. If loop function selection capability is not implemented, the process may pass (when no bus error signal is detected) from step 210 to step 206 to repeat the attempt to inject an error until successful or to step 204 to await the next actuation of the push-button switch initiating error injection. In any case, the process proceeds until terminated by an external event, such as powering off the system being tested.

Figure 3:
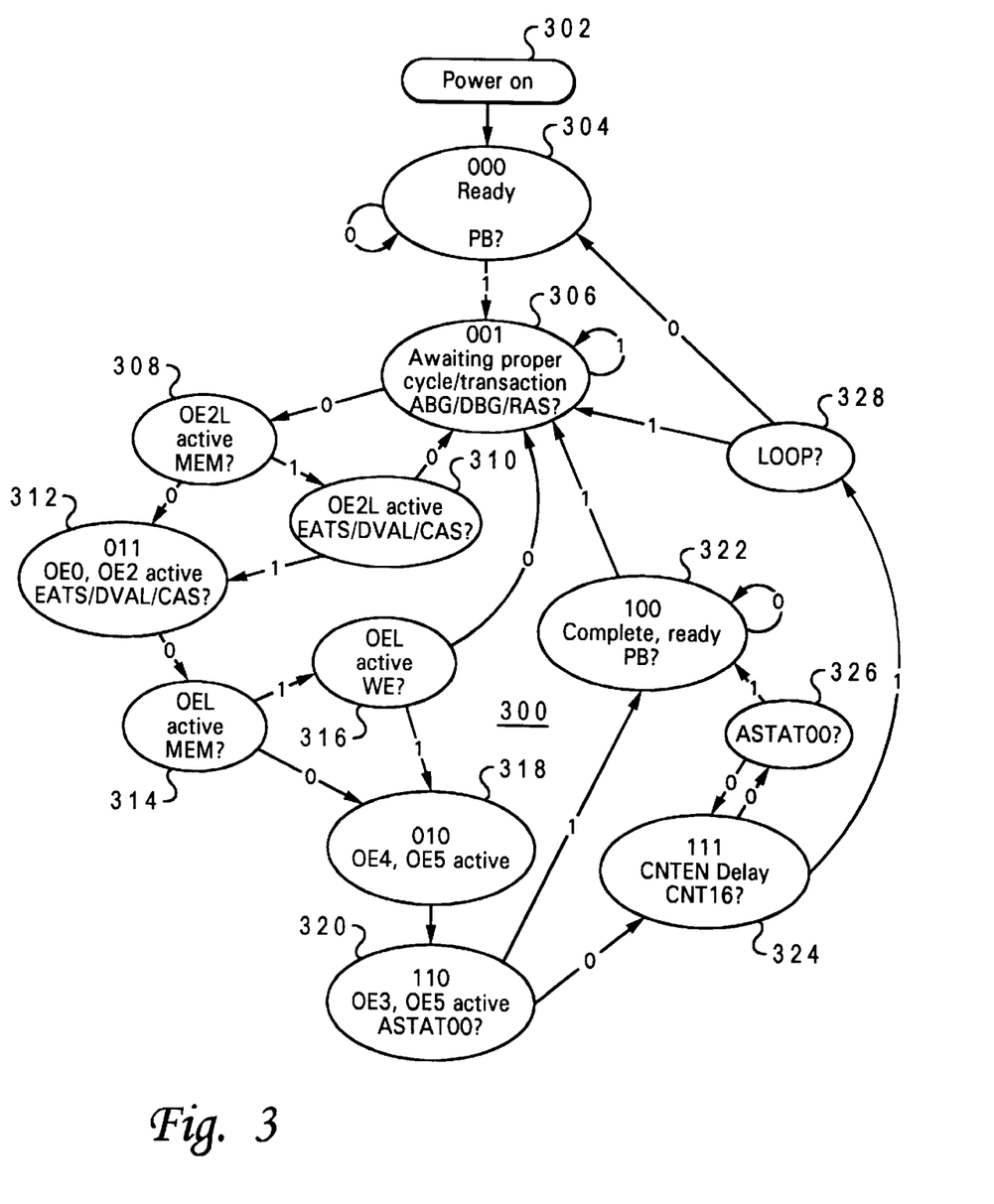
FIG. 3 depicts a state diagram for control logic within an error injection tool in accordance with a preferred embodiment of the present invention.

With reference now to FIG. 3, a state diagram for control logic within an error injection tool in accordance with a preferred embodiment of the present invention is depicted. The state diagram represents the operation of control logic 104 within error injection tool 120 depicted in FIG. 1B. Control logic 104 implements a 7-state state machine, with states 1 and 7 being idle states where, respectively, no error was injected and an error was successfully injected. The remaining states are error output enable states each having a specific error injector enable signal OEx associated with it. The error output enable signals OEx trigger the error injector chip to drive the bus with the error signal. The specific OEx signal utilized to trigger the error injector depends both on the bus into which the error is to be placed and the particular error desired.

From system power-on (block 302) of the data processing system in which the error injection tool in installed, the state machine 300 passes to state 000 (block 304) which indicates that the error injection tool is ready. Transition from state 000 depends on whether the push-button employed to initiate error injection has been actuated. If not, the state machine remains in state 000; if so, however, the state machine passes to state 001 (block 306).

In state 001, the state machine is awaiting the proper bus cycle or transaction into which an error is to be injected. Transition from state 001 depends on whether the ABG/DBG/CAS input (active low) is asserted. If not, the state machine remains in state 001; if so, however, the state machine either transitions to state 011 (block 312) or remains in state 001. The transition is dependent on the state of the MEM input (block 308) and the EATS/DVAL/CAS input (block 310). Error output enable OE2L is asserted during the transition and turned off once the state machine reaches state 011 or returns to state 001. If the MEM input is not asserted, the state machine transitions to state 011. If the MEM input is asserted and the EATS/DVAL/CAS input (active low) is also asserted, the state machine remains in state 001. However, if the MEM input is asserted but the EATS/DVAL/CAS input is not asserted, the state machine transitions to state 011.

In state 011, error output enables OE0 and OE2 are active. Transition from state 011 depends on the state of EATS/DVAL/CAS input. If not asserted, the state machine remains in state 011. If the EATS/DVAL/CAS input is asserted, however, the state machine transitions to either state 001, described above, or to state 010 (block 318) depending on the state of the MEM input and the WE input. In transitioning from state 011, error output enable OEL is active and is turned off when the state machine reaches state 010 or returns to state 001. If the MEM input (block 314) is not asserted, the state machine transitions to state 010. If the MEM input is asserted, however, and the WE input (active low) is also asserted (block 316) the state machine returns to state 001. If the MEM input is asserted and the WE input is not asserted, the state machine transitions to state 010.

In state 010, error output enables OE4 and OE5 are active. The state machines transitions directly to state 110 (block 320), in which error output enables OE3 and OE5 are active. Transition from state 110 depends on the state of the ASTAT00 input. If the ASTAT00 input is asserted, the state machine transitions to state 100 (block 322), an idle state in which the error injection tool is ready and an successful error injection has completed, and in which the RDY and CMPL LEDs are on. From state 100, the state machine transitions back to state 001 if the push-button switch is actuated or remains in state 100 if not.

If the ASTAT00 input were not asserted, the state machine transitions from state 110 to state 111 (block 324), in which CNTEN signal is active. CNTEN enables a count to count 16 clock cycles while checking the state of the ASTAT00 input. If 16 clock cycles have not elapsed and the ASTAT00 input is not asserted (block 326), the state machine remains in state 111. If the ASTAT00 input is asserted before 16 clock cycles have elapsed, the state machine transitions to state 100. However, if 16 clock cycles elapse without the ASTAT00 input being asserted, the state machine transitions to either state 000, if the LOOP input is not asserted (block 328), or to state 001, if the LOOP input is asserted.

The present invention allows injection of single cycle, precise errors on a bus having error detection and recovery facilities to be tested. The error injection tool is inexpensive, easily capable of being constructed from off-the-shelf components, and readily adaptable to different busses within a data processing system. However, the error injection tool is effective and so simple to use that users with little or no training may employ the error injection tool to verify fault isolation and recovery designs. Furthermore, the error injection tool of the present invention may be employed for a variety of busses and can inject multiple errors for each bus, more efficiently than tools designed for only a specific error and/or a specific bus architecture.

Unlike existing design verification tools, the error injection tool and verification method of the present invention allows focused testing of error handling facilities in a bus design. The dynamic error injection of the present invention will test such error handling facilities in a manner that is similar to the manner in which an actual error will occur during operation (i.e., single cycle error on a bus conductor).

While the invention has been particularly shown and described with reference to a preferred embodiment, it will be understood by those skilled in the art that various changes in form and detail may be made therein without departing from the spirit and scope of the invention.

What is claimed is:

1. A method of verifying error detection and recovery designs, comprising:

connecting an error injection tool to a selected bus conductor within a bus;

monitoring the bus for a predetermined transaction or cycle when a selected device is driving the bus;

responsive to detecting the predetermined transaction or cycle on the bus, overdriving the selected bus conductor to a logic high or a logic low to inject an error on the bus for one cycle;

monitoring a response of the bus to the injected error; and responsive to determining that an error was not infected onto the bus, repeating the steps of monitoring the bus for a predetermined transaction or cycle when a selected device is driving the bus, responsive to detecting the predetermined transaction or cycle on the bus, overdriving the selected bus conductor to a logic high or a logic low to inject an error on the bus, and monitoring a response of the bus to the injected error, until an error is successfully injected onto the bus.

2. The method of claim 1, wherein the step of connecting an error injection tool to a selected bus conductor within a bus further comprises:

connecting the error injection tool to a processor local bus.

3. The method of claim 1, wherein the step of connecting an error injection tool to a selected bus conductor within a bus further comprises:

connecting the error injection tool to a system bus.

4. The method of claim 1, wherein the step of connecting an error injection tool to a selected bus conductor within a bus further comprises:

connecting the error injection tool to a memory bus.

5. The method of claim 1, wherein the step of connecting an error injection tool to a selected bus conductor within a bus further comprises:

connecting the error injection tool to a peripheral component interconnect bus.

6. The method of claim 1, wherein the step of monitoring the bus for a predetermined transaction or cycle further comprises:

monitoring the bus for an address tenure.

7. The method of claim 1, wherein the step of monitoring the bus for a predetermined transaction or cycle further comprises:

monitoring the bus for a data tenure.

8. The method of claim 1, wherein the step of overdriving the selected bus conductor to a logic high or a logic low to inject an error on the bus further comprises:

overdriving the selected bus conductor for a single bus cycle.

9. The method of claim 1, wherein the step of overdriving the selected bus conductor to a logic high or a logic low to inject an error on the bus further comprises:

disconnecting a first bus conductor; and overdriving a second bus conductor to a logic high or a logic low for a single bus cycle.

10. The method of claim 1, wherein the step of monitoring a response of the bus to the injected error further comprises:

monitoring bus error signals to determine whether an error was successfully injected onto the bus.

11. An error injection tool for verifying error detection and recovery designs, comprising:

control logic receiving a plurality of bus signals and an activation signal; and an error injector including an output adapted for selective connection to a selected bus conductor within a bus and an input receiving an enable signal from the control logic, wherein the error injector overdrives the selected bus conductor to a logic high or a logic low to inject an error on the bus when the enable signal is actuated, wherein the control logic, responsive to detecting actuation of the activation signal:

monitors the bus for a predetermined transaction or cycle;

responsive to detecting the predetermined transaction or cycle on the bus, actuates the enable signal to the error injector; and monitors a response of the bus to determine if an error was successfully injected.

12. The error injection tool of claim 11, wherein the error injector is adapted for connection to a bus conductor within a processor local bus.

13. The error injection tool of claim 11, wherein the error injector is adapted for connection to a bus conductor within a system bus.

14. The error injection tool of claim 11, wherein the error injector is adapted for connection to a bus conductor within a memory bus.

15. The error injection tool of claim 11, wherein the error injector is adapted for connection to an address/data bus conductor within a peripheral component interconnect bus.

16. The error injection tool of claim 11, wherein the error injector comprises a buffer circuit.

17. The error injection tool of claim 11, wherein the activation signal is actuated by a debounced, push-button switch.

18. The error injection tool of claim 17, wherein the control logic monitors the bus for an address tenure.

19. The error injection tool of claim 17, wherein the control logic monitors the bus for a data tenure.

20. The error injection tool of claim 17, wherein the control logic monitors the bus for a predetermined transaction or cycle when a selected device is driving the bus.

21. The error injection tool of claim 11, wherein the control logic receives parity error and system error signals from the bus.

22. The error injection tool of claim 21, wherein the control logic monitors the parity error and system error signals after actuating the enable signal to determine if an error was successfully injected onto the bus.

23. The error injection tool of claim 22, wherein the control logic, responsive to determining that an error was not injected onto the bus:

monitors the bus for the predetermined transaction or cycle;

responsive to detecting the predetermined transaction or cycle on the bus, actuates the enable signal to the error injector; and monitors a response of the bus to determine if an error was successfully injected.

24. The error injection tool of claim 11, wherein the control logic, responsive to detecting the predetermined transaction or cycle on the bus, actuates the enable signal for a single cycle.

25. The error injection tool of claim 11, wherein the control logic and the error injector are mounted on a standard PCI expansion board with the present signals open, the control logic receiving the plurality of bus signals from conductors connected to corresponding contacts in a PCI bus expansion slot receiving the PCI expansion board.

26. A method of verifying error detection and recovery designs, comprising:

monitoring a bus for a transaction into which a desired fault is to be injected;

responsive to detecting the transaction, overdriving a bus conductor during a cycle following the transaction to inject a fault onto the bus;

monitoring a bus error signal to determine if the fault was successfully injected onto the bus; and responsive to detecting assertion of the bus error signal, monitoring a response of fault isolation and recovery facilities to the injected fault to verify proper operation of the fault isolation and recovery facilities.

* * * * *